United States Patent [19]
Hollyer

[11] Patent Number: 5,148,450
[45] Date of Patent: Sep. 15, 1992

[54] DIGITAL PHASE-LOCKED LOOP

[75] Inventor: Robert J. Hollyer, Los Altos, Calif.

[73] Assignee: Apple Computer, Inc., Cupertino, Calif.

[21] Appl. No.: 524,221

[22] Filed: May 15, 1990

[51] Int. Cl.[5] .............................................. H03D 3/22
[52] U.S. Cl. ...................................... 375/81; 329/303; 375/82; 375/108
[58] Field of Search ............... 329/302, 303, 306, 307, 329/308, 309, 300, 301; 375/80, 81, 83, 87, 90, 110, 120, 82, 88, 106, 108; 360/51, 43

[56] References Cited

U.S. PATENT DOCUMENTS

| | | | |
|---|---|---|---|
| 3,925,614 | 12/1975 | Bousmar | 329/302 |
| 4,330,863 | 5/1982 | Wright | 375/81 |
| 4,561,098 | 12/1985 | Tol | 329/302 |
| 4,584,695 | 4/1986 | Wong et al. | 375/81 |
| 4,821,293 | 4/1989 | Shimizume et al. | 375/81 |

Primary Examiner—Benedict V. Safourek
Attorney, Agent, or Firm—Blakely, Sokoloff, Taylor & Zafman

[57] ABSTRACT

An external digital phase locked loop for use in connection with a conventional serial communication controller is driven by a clock whose frequency is ten times the nominal data rate. Bit cells are divided into ten contiguous states. An adjustment window encompasses two states on either side of the nominal bit cell boundary. If a data transition is detected in either of two states later than the cell boundary, the bit cell timing is extended by one full state. On the other hand, if a data transition is detected in either of two states earlier than the nominal bit cell boundary, the bit cell timing is decreased by one full state.

9 Claims, 5 Drawing Sheets

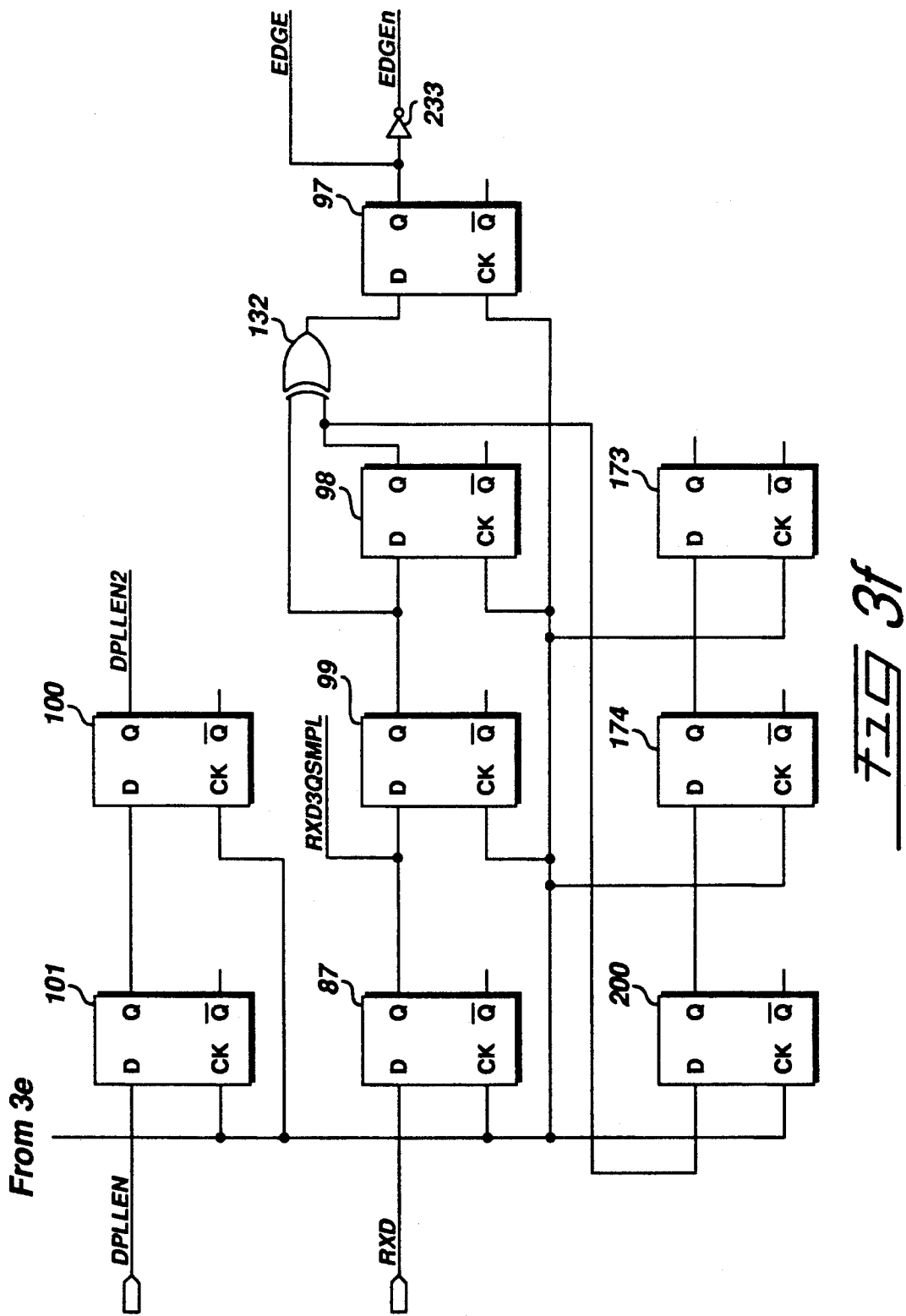

DIGITAL PHASE-LOCKED LOOP

BACKGROUND OF THE INVENTION

1. Field Of The Invention

This invention relates to digital communications systems, and more particularly to a method and apparatus for recovering clock information from a data stream.

2. Background Art

Data processing systems commonly employ serial data communication paths. Serial data is typically transferred at relatively slow rates so that it is inefficient for a central processor to maintain real time control over data transfers. Accordingly, it is common practice to include a serial communications controller in a data processing system architecture. Such devices are readily available from various manufacturers. One such device is the Z8030/Z8530 serial communications controller (SCC) distributed by Zilog, Inc. of Campbell, Calif.

The Zilog SCC is a dual-channel, multi-protocol data communications peripheral device intended for use with eight and sixteen-bit microprocessors. Each channel of this device contains an internal digital phase-locked loop (DPLL) for recovery of clock information from a data stream with NRZI or FM encoding. The internal DPLL is driven by a clock having a frequency that is nominally 32 (NRZI encoding) or 16 (FM encoding) times the data rate. The DPLL uses this clock, along with the data stream to construct a receive clock for the data. This clock can then be used as the SCC receive clock, the transmit clock, or both. The device may also operate with an external DPLL, and one of the objects of the present invention is to provide an external DPLL suitable for use with a SCC of the type thus described.

SUMMARY OF THE INVENTION

The present invention provides an external digital phase locked loop (DPLL) for use in connection with a conventional serial communications controller (SCC). The DPLL is driven by a clock whose frequency is ten times the nominal data rate. Bit cells are divided into ten contiguous states. An adjustment window encompasses two states on either side of the nominal bit cell boundary. If a data transition is detected in either of two states later than the cell boundary, the bit cell timing is extended by one full state. On the other hand, if a data transition is detected in either of two states earlier than the nominal bit cell boundary, the bit cell timing is decreased by one full state.

If a data transition occurs within the predicted state or within the adjustment window, it is considered to be a valid edge. If a valid edge is not detected within a bit cell, a count of missing edges is maintained. If no valid edge is detected in two consecutive bit cells, the state counter is caused to jump by the equivalent of a half bit cell and reacquisition of the data signal is attempted.

In addition to the missing edge logic, a carrier sensor is provided that will timeout if no data transitions are detected within a period of approximately eight microseconds.

DETAILED DESCRIPTION OF THE INVENTION

In the following description, for purposes of explanation and not limitation, specific timing relationships, logical circuits, etc. are set forth in order to provide a thorough understanding of the present invention. However, it will be apparent to one skilled in the art that the present invention may be practiced in other embodiments that depart from these specific details. In other instances, detailed descriptions of well known circuit elements are omitted so as to not obscure the description of the present invention with unnecessary detail.

Figure 1:
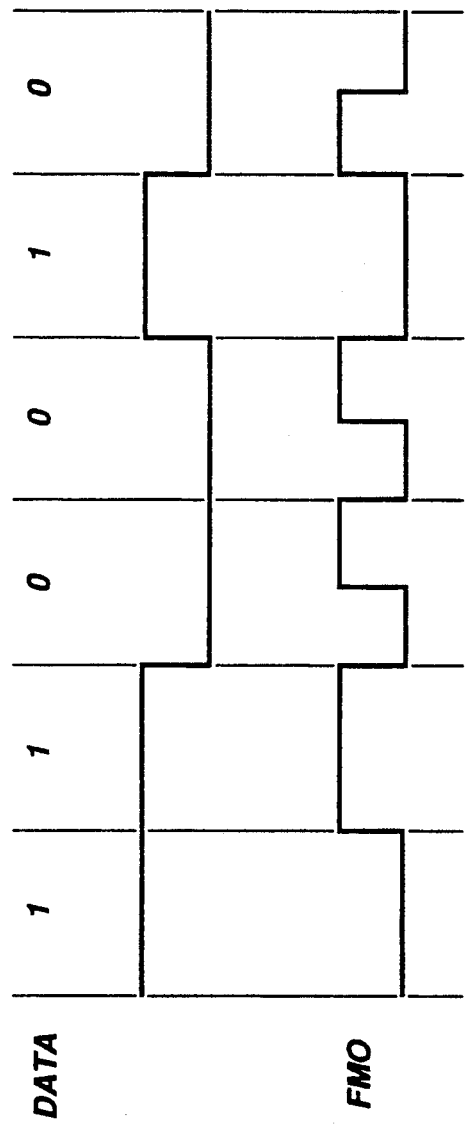
FIG. 1 illustrates FM0 data encoding as employed with the present invention.

In a preferred embodiment, the present invention operates with FMO data encoding, which is also referred to as biphase space encoding. However, with suitable modifications, the present invention may also be applied to biphase mark (FM1) or other data encoding protocols. As shown in FIG. 1, a data stream comprises a contiguous series of bit cells. With FM0 encoding, a transition is present at every bit cell boundary, and an additional transition is present in the middle of each bit cell representing a logical 0. A logical 1 is represented by the absence of a transition within the bit cell. Sufficient information is contained within the data stream to recover a clock signal.

Figure 2:
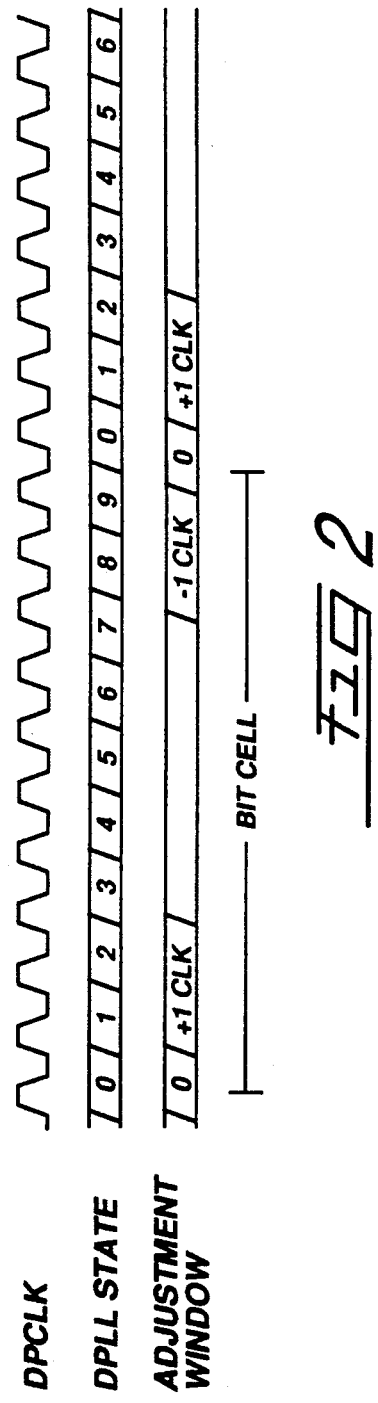
FIG. 2 is a timing diagram illustrating operation of the present invention.

In the embodiment of the present invention described below, the DPLL operates with a clock having a frequency that is ten times the nominal data rate. Therefore, as shown in FIG. 2, a nominal bit cell comprises ten clock cycles. Each clock cycle defines a DPLL state numbered 0 through 9. The nominal bit cell boundary is intended to fall within DPLL state 0. An adjustment window comprises two states on either side of state 0. As will be described below, if a data transition occurs within state 1 or state 2, the bit cell is extended by one clock cycle. Conversely, if a data transition is detected in DPLL state 8 or state 9, the next subsequent bit cell is decreased by one clock cycle. It should be noted that if a data 0 is transmitted, the mid-cell transition will nominally occur within DPLL state 5. Since the adjustment window comprises two clock cycles on either side of the nominal bit cell boundary, a corresponding amount of jitter may be tolerated with respect to a mid-cell transition without falsely detecting such a transition as a cell boundary. That is, a mid-cell transition can occur as early as state 3 or as late as state 7 without falling within the adjustment window. It should be particularly noted that this provides the maximum amount of jitter tolerance since the edge of the adjustment window (i.e. the boundary between state 2 and 3) is exactly centered between the nominal bit cell boundary and the nominal mid-cell transition point. This aspect of the invention is in contrast to a conventional DPLL implementation using a clock rate of 16 or 32 times the nominal data rate. Such an implementation has an inherently lower jitter tolerance, since it is impossible to position the edge of the adjustment window halfway between the cell boundary and mid-cell unless the half-cell comprises an odd number of clock cycles.

Referring now to FIGS. 3a–3e, a preferred circuit implementation of the present invention will be described. Master clock BDPCLK is asserted at 4-bit binary counter 50 (FIG. 3a) which has four binary outputs DPS0-DPS3. Counter 50 operates as a conventional divide by 16 counter, and thus outputs DPS0-DPS3 are cyclical at rates equal to the rate of BDPCLK divided by 2, 4, 8 and 16, respectively. Outputs DPS0-DPS3 are asserted at inverters 221, 220, 222 and 223, respectively (FIG. 3b), to provide complementary outputs. Negative-going envelopes for states 1, 2, 3, 6, 8 and 9 are developed by gates 216, 225, 217, 210, 227 and 211, respectively (FIG. 3c), whose outputs are denoted ST1n, ST2n, ST3n, ST6n, ST8n and ST9n, respectively. A negative-going envelope spanning both states 4 and 5 is developed by gate 224 whose output is denoted as ST45n.

Figure 3A:
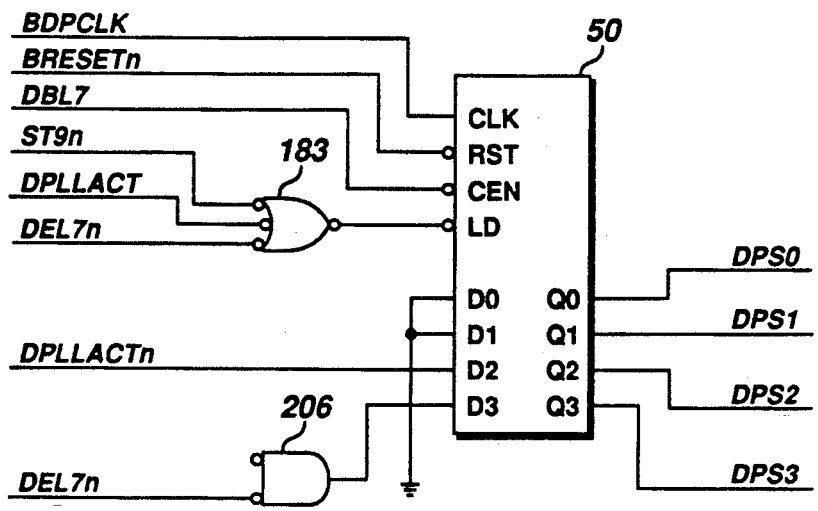
FIGS. 3a–3e present a schematic diagram of a circuit for implementing a preferred embodiment of the present invention.
Figure 3B:
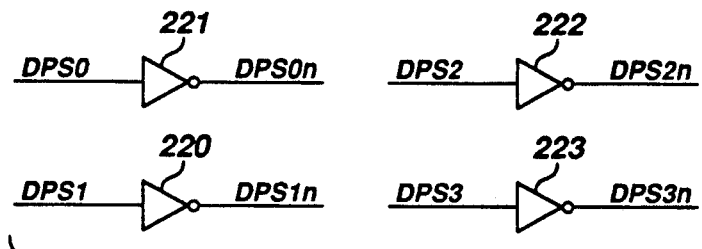
Figure 3C:
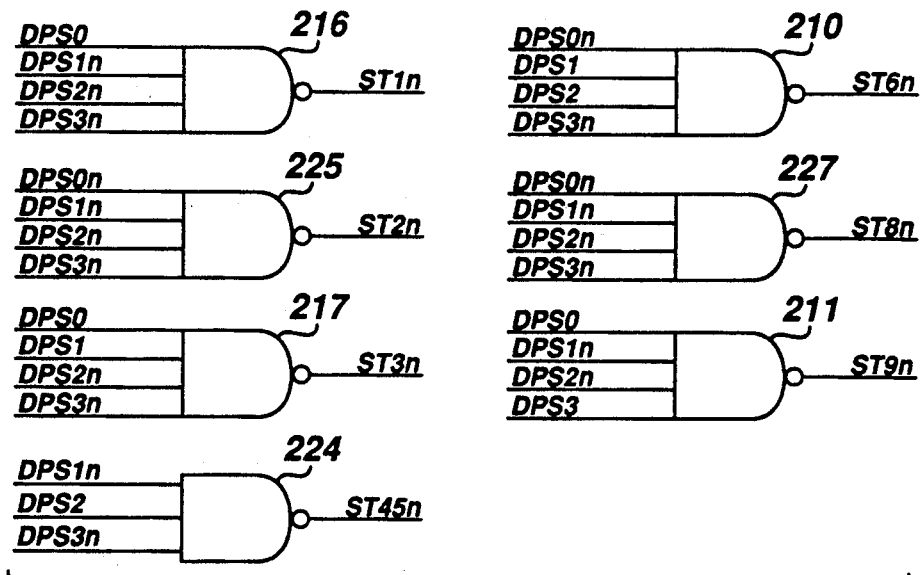
Figure 3D:
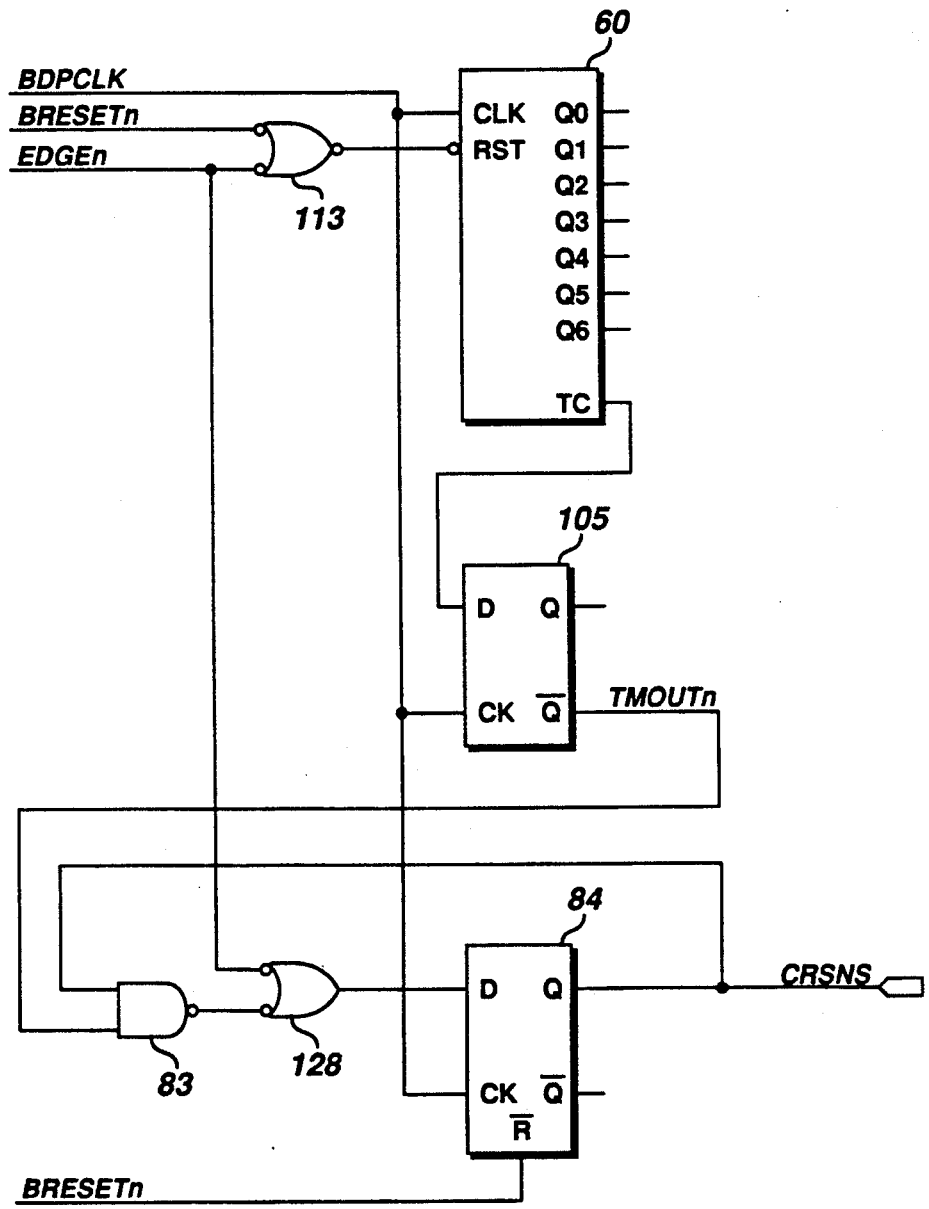
Figure 3E:
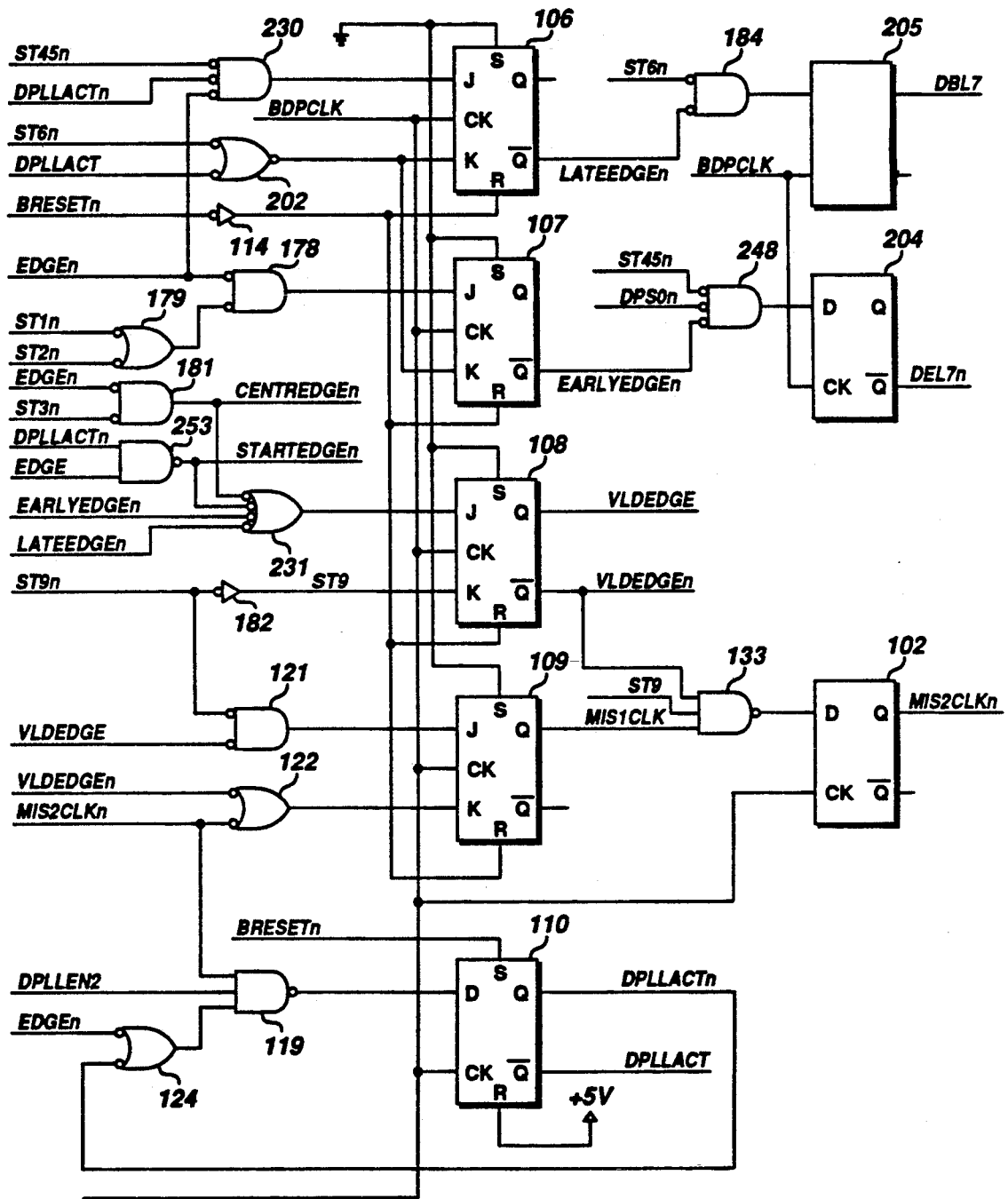

Referring to FIG. 3e, the received data stream RXD is asserted at flip-flop 87. The Q output of flip-flop 87 is coupled to the input of flip-flop 99, whose Q output is, in turn, coupled to the input of flip-flop 98. All flip-flops are clocked by master clock BDPCLK, and thus each flip-flop introduces a one clock cycle (one state) delay. The Q outputs of flip-flops 98 and 99 are combined in exclusive OR gate 132 to develop a one clock wide pulse which is asserted at the input of flip-flop 97. The Q output of flip-flop 97 provides signal EDGE which is a one clock wide pulse delayed by three clock cycles from the occurrence of a transition on data input RXD. Signal EDGE is asserted at inverter 233 to develop a complementary signal EDGEn.

The combination of gates 202, 230, 184 and flip-flops 106, 205 provide signal DBL7 whenever signal EDGE aligns with DPLL states 4 or 5, i.e. whenever a received data transition occurs within DPLL states 1 or 2. Such an occurrence implies that the received data transition is late with respect to the nominal timing, thereby requiring an adjustment of the bit cell timing. Signal DBL7 is asserted at counter 50 to extend DPLL state 7 by one clock cycle, thus lengthening the bit cell timing by a corresponding amount.

The combination of gates 178, 179, 248 and flip-flops 107, 204 provide signal DEL7n whenever signal EDGE aligns with DPLL states 1 or 2, i.e. whenever a received data transition occurs within DPLL states 8 or 9. Such an occurrence implies that the received data transition is early with respect to the nominal timing, again requiring an adjustment of the bit cell timing. Signal DEL7n is asserted at gates 183 and 206 and operates to cause DPLL state 7 to be deleted by counter 50, thus shortening the bit cell timing by one clock cycle.

The combination of gates 181, 253, 231, inverter 182 and flip-flop 108 provide signal VLDEDGE whenever signal EDGE aligns with DPLL states 1, 2, 3, 4 or 5, i.e. whenever a received data transition occurs within DPLL states 8, 9, 0, 1 or 2. Such an occurrence implies that a valid EDGE was received for the present bit cell. When generated, signal VLDEDGE remains high until DPLL state 9 is reached. If DPLL state 9 is reached without signal VLDEDGE having been generated, flip-flop 109 generates signal MIS1CLK to indicate that a valid data transition was not received during the bit cell. Signal MIS1CLK is asserted at gate 133 along with signals ST9 and VLDEDGEn. The output of gate 133 is asserted at the input of flip-flop 102 which generates signal MIS2CLKn if a valid data transition is not detected in two consecutive bit cells. Signal MIS2CLKn is asserted at gate 119 whose output is asserted at the input of flip-flop 110. Flip-flop 110 generates complementary signals DPLLACT and DPLLACTn.

One possible reason for a data transition being missed in two successive bit cells is that the bit cell timing has become synchronized with mid-cell transitions rather than the cell boundary transitions. Thus, a string of logical ones in which there are no mid-cell transitions would cause signal MIS2CLKn to be generated. To recover from such a condition, the bit cell timing must be shifted by a half cell or five states. To accomplish this, signal DPLLACT and its complement DPLLACTn cause counter 50 to be loaded with a count of 4, thereby causing a jump from DPLL state 9 to state 4.

Referring now to FIG. 3d, counter 60 is a seven-bit binary counter that is reset upon detection of each received data transition. As long as data transitions are detected before counter 60 reaches its terminal count, the Q output of flip-flop 84 (signal CRSNS) is held high, indicating that a data carrier signal is detected. If counter 60 reaches its terminal count, output TMOUTn of flip-flop 105 goes low causing signal CRSNS to go low, thereby indicating the loss of a data carrier signal.

It will be recognized that the above described invention may be embodied in other specific forms without departing from the spirit or essential characteristics of the disclosure. Thus it is understood that the invention is not to be limited by the foregoing illustrative examples except as set forth in the appended claims.

I claim:

1. An apparatus for maintaining synchronization of an FM encoded data signal having a contiguous series of bit cells and having a predetermined nominal data rate comprising:
   (a) clock means for generating a clock signal having a frequency of 2n times the nominal data rate, where n is an odd integer;
   (b) state generation means coupled to said clock means for dividing each data bit cell into 2n contiguous states;
   (c) edge detection means for detecting a transition of the data signal;
   (d) edge validation means coupled to said edge detection means and said state generation means for determining that the detected data signal transition occurs within a valid state;
   (e) state extension means coupled to said edge detection means and said state generation means for extending one of the states if the detected data signal transition is detected earlier than a nominal arrival time; and
   (f) state deletion means coupled to said edge detection means and said state generation means for deleting said one of the states if the detected data signal transition is detected later than said nominal arrival time.

2. The apparatus of claim 1 further comprising missed edge detection means coupled to said edge validation means and said state generation means for providing a missed edge signal if no data signal transition is detected within a valid state of a current bit cell.

3. The apparatus of claim 2 further comprising missed edge counting means coupled to said missed edge signal for determining when no data signal transition is detected within a valid state of at least two consecutive bit cells and for causing said state generation means to jump to a predetermined state.

4. The apparatus of claim 1 wherein said state generation means comprises a counter and said state extension means comprises means for inhibiting said counter.

5. The apparatus of claim 1 wherein said state generation means comprises a counter and said state deletion means comprises means for loading said counter with a predetermined value.

6. The apparatus of claim 1 wherein n is 5.

7. A method for maintaining synchronization of an FM encoded data signal having a contiguous series of bit cells and having a predetermined nominal data rate comprising the steps of:
   (a) providing a clock signal having a frequency of 2n times the nominal data rate, where n is an odd integer:
   (b) dividing each data bit cell into 2n contiguous states:
   (c) detecting a transition of the data signal;
   (d) determining if the detected data signal transition is detected within a valid state:
   (e) extending one of the states if the detected data signal transition is detected earlier than a nominal arrival time: and
   (f) deleting said one of the states if the detected data signal transition is detected later than said nominal arrival time.

8. The method of claim 7 further comprising the step of jumping to a predetermined state if no data signal transition is detected within a valid state of at least two consecutive bit cells.

9. The method of claim 7 wherein n is 5.

* * * * *